United States Patent [19]

Bauer et al.

[11] Patent Number: 4,621,800

[45] Date of Patent: Nov. 11, 1986

[54] ARRANGEMENT FOR AND METHOD OF TRANSFERRING FILM

[75] Inventors: Walter Bauer; Heinrich Färber, both of Munich; Rudolf Schneider, Pfaffenhofen/Ilm, all of Fed. Rep. of Germany

[73] Assignee: Agfa-Gevaert Aktiengesellschaft, Leverkusen, Fed. Rep. of Germany

[21] Appl. No.: 557,740

[22] Filed: Dec. 2, 1983

[30] Foreign Application Priority Data

Dec. 29, 1982 [DE] Fed. Rep. of Germany ....... 3248458

[51] Int. Cl.⁴ .............................................. B65H 5/08
[52] U.S. Cl. .................................. 271/11; 271/31.1; 271/102; 271/125; 271/314
[58] Field of Search ....................... 271/19, 20, 21, 22, 271/23, 24, 25, 11, 12, 13, 30 A, 102, 107, 122, 125, 188, 272, 273, 274, 314, 31.1

[56] References Cited

U.S. PATENT DOCUMENTS

| | | | |
|---|---|---|---|
| 3,578,312 | 5/1971 | Kocourek | 271/24 |
| 3,827,545 | 8/1974 | Buhayar | 271/203 |
| 4,136,861 | 1/1979 | Goff, Jr. | 271/22 |
| 4,364,550 | 12/1982 | Hynes | 271/11 |
| 4,420,149 | 12/1983 | Schutes et al. | 271/122 |
| 4,509,736 | 4/1985 | Stahl et al. | 271/107 |

FOREIGN PATENT DOCUMENTS 2033348  5/1980  United Kingdom ................ 271/125

Primary Examiner—Bruce H. Stoner, Jr.
Assistant Examiner—John A. Carroll
Attorney, Agent, or Firm—Peter K. Kontler

[57] ABSTRACT

A suction device is movable between a receiving position in which it removes a sheet of film from a magazine and a delivery position in which it transfers the sheet to a conveyor. The effective width of the suction device approximates or equals the width of the smallest sheet of film to be transferred. Sheets having a width greater than the smallest width are gripped in the region of one end thereof leaving the remainder of such a sheet free to deflect. In order to permit proper transfer of all sheets into the conveyor, the latter is provided with grooved rollers which lift the deflected portions of larger sheets into the conveyor. In the delivery position, the suction device is located opposite one portion of the conveyor. The conveying force exerted by this portion of the conveyor is smaller than the gripping force which the suction device exerts on a sheet but larger than the conveying force exerted by a laterally adjacent portion of the conveyor. The portion of a sheet in the latter part of the conveyor constitutes a moment arm when the sheet enters the conveyor and the vacuum in the suction device fails to shut off. The tendency is for the sheet to rotate about an axis which is located in the vicinity of the suction device and is normal to the sheet. This tendency is reduced by maintaining a relatively low conveying force in the portion of the conveyor remote from the suction device and maintaining a relatively high gripping force for the suction device.

26 Claims, 3 Drawing Figures

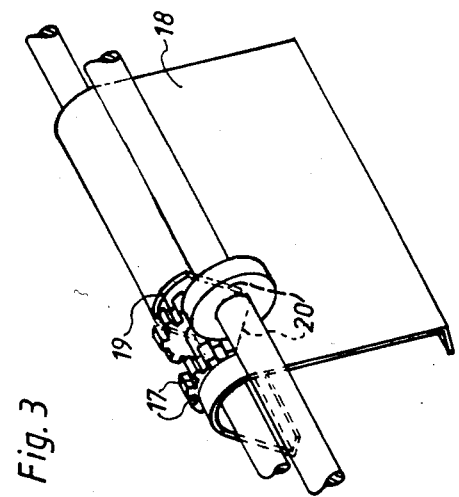
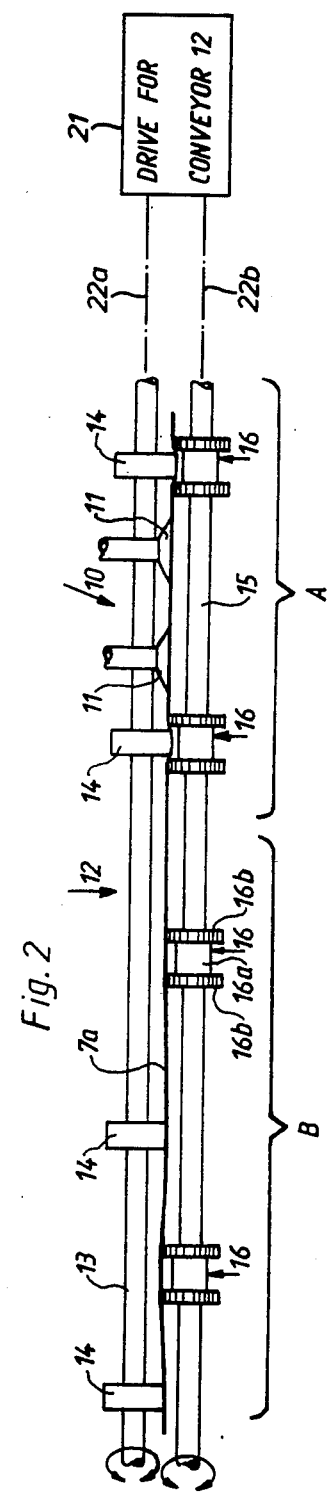

ARRANGEMENT FOR AND METHOD OF TRANSFERRING FILM

BACKGROUND OF THE INVENTION

The invention relates generally to an arrangement for and a method of transferring sheet-like articles.

More particularly, the invention relates to an arrangement for and a method of transferring sheets of photosensitive material.

In a more specific aspect, the invention relates to an arrangement for and a method of removing sheets of film, especially X-ray film, from a container.

The German Offenlegungsschrift No. 31 22 585 discloses an arrangement for removing film, particularly X-ray film, from an upright container having a discharge opening for withdrawal of the film. The container accommodates sheets of film having different sizes. The sheets are stacked one behind the other in upright positions. The container has an internal lateral abutment and a lateral edge of each sheet of film is brought into contact with the abutment before withdrawal of the sheet from the container. This insures that all of the sheets are in the same position upon being removed from the container. Removal of the sheets from the container is effected by a suction device having an effective width which approximates or equals the width of the smallest film. The suction device removes the sheets of film from the container and transfers these to a conveyor.

A problem with the above arrangement stems from the fact that the width of the largest sheet of film may be between five and seven times the effective width of the suction device. In this regard, the suction device has a plurality of suction heads and the term "effective width of the suction device" is intended to mean the distance between the two outermost suction heads. The suction device is mounted in such a fashion that a large sheet of film is gripped at only one side thereof, that is, the suction device grips one side but not the other of a large sheet of film. As a result, large sheets of film are frequently fed into the conveyor obliquely rather than straight. This can occur, for instance, when a sheet of film is grasped by the conveyor before the vacuum in the suction device has been completely destroyed. Thus, the portion of the film held by the suction device may be hindered or prevented from entering the conveyor by the vacuum which remains in the suction device. On the other hand, the portion of the film which is not gripped by the suction device is relatively unrestricted against being drawn into the conveyor. The moment arm obtained in this manner causes the film to rotate so that the film assumes an oblique position.

OBJECTS AND SUMMARY OF THE INVENTION

It is an object of the invention to provide a transfer arrangement which makes it possible to feed sheet-like articles into a conveyor in a desired orientation.

Another object of the invention is to provide a transfer arrangement which makes it possible to feed sheet-like articles into a conveyor without rotation of the articles even if the articles are gripped at only one side thereof.

An additional object of the invention is to provide a transfer arrangement which makes it possible to remove sheet-like articles from a container and to introduce the articles into a conveyor without rotation of the articles by the conveyor.

A further object of the invention is to improve the arrangement described earlier in such a manner that the film may be introduced into the conveyor without undesired changes in orientation.

It is also an object of the invention to provide a transfer method which enables sheet-like articles to be fed into a conveyor in a desired orientation.

Yet another object of the invention is to provide a transfer method which enables sheet-like articles to be fed into a conveyor without rotation thereof by the conveyor even if the articles are gripped at only one side.

Still a further object of the invention is to provide a transfer method which makes it possible to remove a sheet-like article from a container and introduce it into a conveyor without rotation of the article by the conveyor.

The preceding objects, as well as others which will become apparent as the description proceeds, are achieved by the invention.

One aspect of the invention resides in an arrangement for transferring sheet-like articles. The arrangement comprises the following:

a. Receiving means for accommodating at least one sheet-like article.

b. Conveyor means for transporting the article along a predetermined direction. The conveyor means has first and second portions disposed next to one another as considered transverse to the predetermined direction.

c. Gripping means movable between a receiving position in the region of the receiving means and a delivery position in the region of the first portion of the conveyor means. The gripping means is designed to engage the article with a predetermined force in the receiving position for transfer of the article to the delivery position in which the article is engageable by the conveyor means. The first portion of the conveyor means is designed to exert a first conveying force on the article which is smaller than the predetermined force with which the gripping means engages the article. The second portion of the conveyor means is designed to exert a second conveying force on the article which is smaller than the first conveying force.

The gripping means may, for example, comprise a suction device.

The arrangement of the invention is particularly well-suited for removing film, especially X-ray film, from a container and delivering the film to the conveyor means.

According to one embodiment of the invention, the receiving means is arranged to accommodate an upright container or magazine for sheet-like articles. The container is designed to confine a stack of sheet-like articles which are arranged one behind the other in upright positions. The container has a discharge opening for the articles and is provided with a lateral abutment against which a lateral edge of each article is moved prior to withdrawal of the article from the container. This insures that all articles have the same position upon being removed from the container.

The receiving means accommodates the container in such a manner that the discharge opening of the container is located adjacent to the receiving position of the gripping means. The gripping means is then able to remove the articles from the container and to transfer the articles to the conveyor means.

The articles in the container may have different widths. In such an event, the gripping means preferably has an effective width which approximates or equals the width of the smallest article. For gripping means in the form of a suction device having multiple suction heads, the effective width is the distance between the two outermost suction heads as considered along the width dimension of the articles.

By designing the conveyor means in accordance with the invention, the portion of the conveyor means remote from the gripping means, i.e. the second portion of the conveyor means, does not cause advancement of an article until the gripping force exerted on the article by the gripping means becomes smaller than the conveying force exerted by the conveyor means. No asymmetric force components act on the article after the suction is terminated so that the article may be drawn into and transported by the conveyor means with its axis parallel to the conveying direction.

Another aspect of the invention resides in a method of transferring sheet-like articles. The method comprises the following steps:

a. Transporting a sheet-like article from a first location to a second location. The transporting step includes applying a predetermined gripping force to the article.

b. Conveying the article away from the second location along a predetermined direction. The conveying step includes applying a first conveying force to a first portion of the article and a second conveying force to a second portion of the article which is next to the first portion as considered transverse to the predetermined direction. The first conveying force is smaller than the predetermined gripping force while the second conveying force is smaller than the first conveying force.

According to one embodiment of the method, the gripping force is applied to the first portion of the article only.

The method of the invention is particularly well-suited for removing film, particularly X-ray film, from a container and transferring the film to a conveyor.

The novel features which are considered as characteristic of the invention are set forth in particular in the appended claims. The improved transfer arrangement itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWINGS

FIG. 2 is a view in the direction of the arrow S of FIG. 1 with certain parts omitted; and FIG. 3 is a perspective view of a portion of the conveyor constituting part of the arrangement of FIG. 1.

DESCRIPTION OF THE PREFERRED EMBODIMENTS

Figure 1:
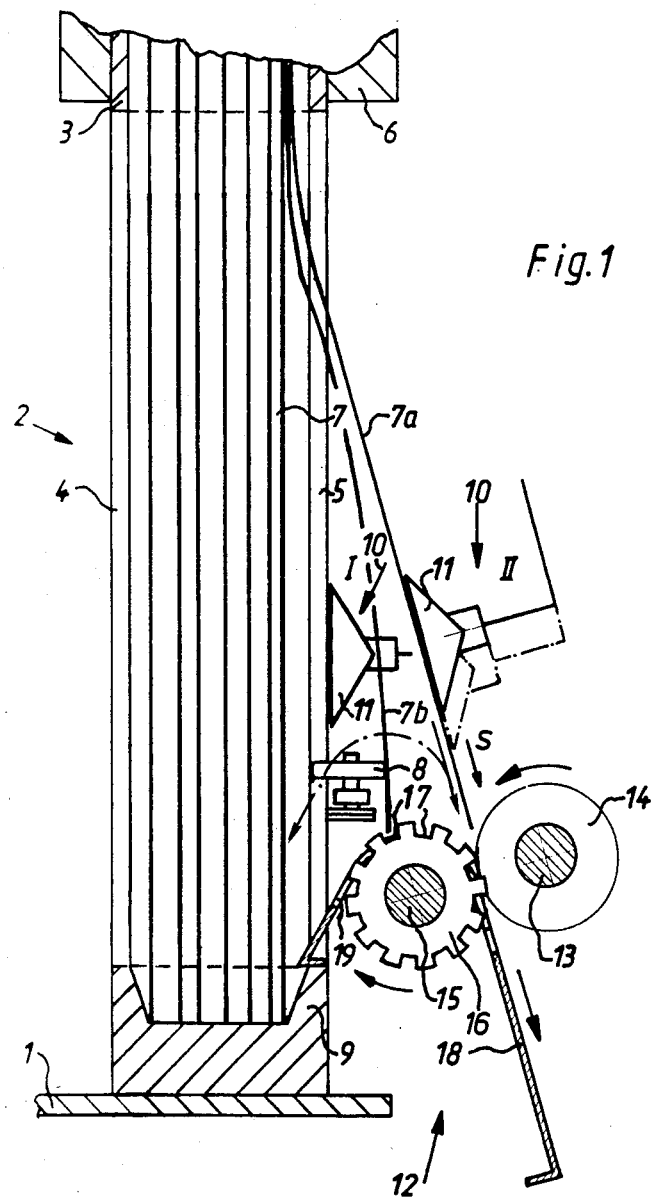
FIG. 1 is a schematic side view of a transfer arrangement according to the invention.

In FIG. 1, the reference 1 identifies a table or support of an arrangement of the type described earlier, namely, an arrangement for removing film from a container and transferring the film to a conveyor. A magazine or container 2 having walls 3 is positioned on the table 1 in an upright position. The magazine 2 is rectangular and openings 4, 5 are formed in the two major surfaces thereof. The openings 4 and 5 are disposed opposite one another. The openings 4, 5 may be sealed against light by a box-like slide 6.

Sheets 7 of film, e.g. X-ray film, having different sizes are accommodated in the magazine 2. The sheets 7 are stacked one behind the other in upright positions. The sheets 7 rest on the lower side 9 of the magazine 2 which constitutes a narrow side of the latter.

In the illustrated embodiment, the opening 5 of the magazine 2 is a discharge opening for withdrawal of the sheets 7 from the magazine 2. The magazine 2 has an internal lateral abutment which is preferably normal to the lower side 9 thereof and is here assumed to be constituted by the inner surface of one of the narrow vertical sides of the magazine 2. Positioning means is provided to bring the vertical edges of the sheets 7 which face the abutment into contact therewith prior to removal of the sheets 7 from the magazine 2 via the discharge opening 5. The positioning means, which is more fully described in the German Offenlegungsschrift No. 31 22 585, is schematically represented by a driven positioning roller 8. The positioning roller 8 acts on the sheet 7 which is nearest the discharge opening 5. Thus, the positioning roller 8 acts on each of the sheets 7 in turn after the preceding sheet has been withdrawn from the magazine 2. When a vertical edge of a sheet 7 has been moved into contact with the abutment on the magazine 2, the position of such vertical edge as well as the position of the lower edge of the sheet 7 are fixed. In other words, each of the sheets 7 assumes the same position before being removed from the magazine 2. It will be observed that the vertical edges of the sheets 7, which are normal to the lower edges thereof, constitute lateral edges of the sheets 7.

Referring still to FIG. 1, gripping means in the form of a schematically illustrated suction device 10 is provided to transfer the sheets 7 of film from the magazine 2 to a conveyor 12. The suction device 10 is connected with a conventional vacuum system. The suction device 10 is movable between a receiving position I and a delivery position II by means of a conventional crank drive. The receiving position I is located adjacent to the discharge opening 5 of the magazine 2. In the receiving position I, the suction device 10 grips the sheet 7 nearest the discharge opening 5 with a force sufficient to remove the sheet 7 from the magazine 2 and to transfer the sheet 7 to the conveyor 12. In the delivery position II, the vacuum is shut off so that the suction device 10 releases the sheet 7 and permits the latter to be transported away from the suction device 10 by the conveyor 12. The reference numeral 7a identifies a sheet of film which has been removed from the magazine 2 and is about to be delivered to the conveyor 12. The full line showing of the suction device 10 in the delivery position II illustrates the suction device 10 shortly before the sheet 7a is transferred to the conveyor 12. The phantom line showing of the suction device 10 in the delivery position II illustrates the suction device 10 at the instant that the sheet 7a is introduced into the conveyor 12.

As seen in FIG. 2, the suction device 10 has a pair of suction heads 11. The suction heads 11 are separated by a distance which approximates or equals the width of the narrowest sheet 7 accommodated by the magazine 2. In other words, the effective width of the suction device 10 is the same or approximately the same as the width of the narrowest sheet 7 in the magazine 2. In the receiving position I, the suction device 10 is located in the region of the abutment on the magazine 2. This insures that each of the sheets 7, regardless of how narrow it may be, will be gripped by both of the suction heads 11. On the other hand, this has the result that the wider sheets 7 are gripped only in the region of one lateral edge thereof. This is clearly seen in FIG. 2 where the sheet 7a being fed into the conveyor 12 is gripped only near the right-hand edge thereof.

With reference to FIGS. 1 and 2, the conveyor 12 comprises a pair of parallel shafts 13 and 15 which extend normal to the direction of transport of the sheet 7a by the conveyor 12. The shafts 13, 15 are connected with a reversible drive 21 via respective linkages 22a, 22b. The shaft 13 carries relatively small, spaced rollers 14 which are fixed to and rotate with the shaft 13. Similarly, the shaft 15 carries spaced rollers 16 which are fixed to and rotate with the shaft 15. The rollers 16 are flanged rollers and each of the rollers 16 comprises a cylindrical roller body 16a having a circular flange 16b mounted at either end thereof. The diameters of the circular flanges 16b exceed the diameters of the roller bodies 16a. The axial length of each roller body 16a, that is, the distance between the flanges 16b of each roller 16, is slightly greater than the widths of the rollers 14.

As best seen in FIG. 1, the circular flanges 16b of the rollers 16 are provided with peripheral grooves 17. As further illustrated in FIG. 1, the shaft 15 with the flanged rollers 16 is located nearer the magazine 2 than the shaft 13.

Referring back to FIG. 2, it may be observed that the conveyor 12 has two portions A and B which are located next to one another as considered normal to the direction of transport of the sheet 7a by the conveyor 12. In the delivery position II, the suction device 10 is located opposite or in the region of the portion A of the conveyor 12.

The rollers 14 and 16 cooperate to transport the sheet 7a away from the suction device 10. To this end, the distance between the shafts 13 and 15, as well as the diameters of the rollers 14 and 16, are selected in such a manner that the rollers 14 and 16 overlap slightly. This is best observed in FIG. 1.

With reference once more to FIG. 2, the rollers 14 and 16 are arranged in pairs. In the portion A of the conveyor 12, the rollers 14 and 16 of each pair are located directly opposite one another. Here, the roller 14 of each pair is received between the flanges 16b of the corresponding roller 16. In the portion B of the conveyor 12, on the other hand, the rollers 14 and 16 of each pair are offset relative to one another.

FIGS. 1 and 3 show guide means for guiding the sheets 7 from the magazine 2 into the conveyor 12. The guide means is omitted in FIG. 2 in order to clearly illustrate the details of the conveyor 12. The guide means comprises a guide sheet 18 which passes between the shafts 13, 15 of the conveyor 12. The guide sheet 18 is bent around the shaft 15 in such a manner that the distance from the shaft 15 to the guide sheet 18 is smaller than the radius of the circular flanges 16b of the rollers 16. This may be achieved, for instance, in that the bent portion of the guide sheet 18 has the same center of curvature as the rollers 16 but a smaller radius of curvature than the circular flanges 16b. In order that the circular flanges 16b may project through the guide sheet 18, the latter is provided with a cutout 19 in the region of each roller 16. As best seen in FIG. 3, the cutouts 19 have pairs of edges 20 which respectively define a V, that is, the cutouts 19 are generally V-shaped when viewed in axial direction of the shafts 13, 15.

The operation of the arrangement according to the invention is as follows:

The magazine 2, which is filled with sheets 7 of film having various sizes, is placed on the table 1 in an upright position. The sheets 7, which are stacked one behind the other, are thus likewise in upright positions. When the magazine 2 is brought to the table 1, the box-like slide 6 is in its closed position and covers the openings 4 and 5 of the magazine 2. Once the magazine 2 has been placed on the table 1, the box-like slide 6 is moved to its open position so that the openings 4 and 5 are exposed. The magazine 2 is here oriented in such a manner that the opening 5 serves as a discharge opening for the sheets 7.

The magazine 2 may serve as a storage container for exposed film. For example, before being brought to the table 1, the magazine 2 may have been loaded with sheets 7 of exposed X-ray film at a loading and unloading station for X-ray cassettes. The sheets 7 may be introduced into the magazine 2 as a group or, alternatively, a succession of sheets 7 may be individually fed into the magazine 2. The magazine 2 may then be used to transport the sheets 7 from the station at which the X-ray cassettes are loaded and unloaded to a developing machine for the X-ray film. The arrangement in accordance with the invention may be mounted at the inlet of such a developing machine in order to remove the sheets 7 of exposed film from the magazine 2 and to transfer the sheets to the developing machine.

After the magazine 2 has been placed on the table 1 and the box-like slide 6 has been moved to its open position, the vacuum system for the suction device 10 is switched on and the suction device 10 is moved to the receiving position I. Before the suction device 10 reaches the receiving position I, the positioning roller 8 moves the sheet 7 nearest the discharge opening 5 against the abutment on the magazine 2. This insures that only one of the sheets 7 is exposed to the action of the suction heads 11 at any time regardless of the size of the sheet 7 nearest the discharge opening 5.

Upon reaching the receiving position I, the suction device 10 grips the sheet 7 nearest the discharge opening 5. The suction device 10 is then moved away from the discharge opening 5 along a curved path to the delivery position II. This action causes the lower edge of the sheet 7 to be withdrawn from the magazine 2 and to travel from left to right in FIG. 1 until it becomes aligned with the nips defined by the rollers 14 and 16 at the inlet side of the conveyor 12. The full line showing of the suction head 10 in the delivery position II represents the condition in which alignment is achieved between the lower edge of the sheet identified by the reference numeral 7a and the nips defined by the rollers 14, 16. Depending upon the size of the sheet 7a, the upper portion thereof may still be confined in the magazine 2 at this time.

After the lower edge of the sheet 7a, which now becomes the leading edge thereof, has been brought into alignment with the nips defined by the rollers 14, 16, the suction device 10 advances towards the conveyor 12 as indicated by the phantom lines at the delivery position II in FIG. 1 thereby feeding the sheet 7a into the conveyor 12. The conveyor 12 is previously set into operation and the rollers 14, 16 rotate in the directions indicated by the arrows in FIG. 1. The directions of rotation are such that the conveyor 12 draws the sheet 7a away from the suction device 10. The vacuum system for the suction device 10 is shut off upon introduction of the sheet 7a into the conveyor 12 so that the suction device 10 releases the sheet 7a.

When the sheet 7a is relatively small, that is, when the width of the sheet 7a is less than or equal to the width of the portion A of the conveyor 12, transfer of the sheet 7a from the suction device 10 to the conveyor 12 occurs with relatively little difficulty. The reason is that the leading edge of the sheet 7a is engaged only by the rollers 14, 16 in the portion A of the conveyor 12, namely, the rollers 14, 16 arranged opposite the suction device 10. The sheet 7a is not engaged by any of the remaining rollers 14, 16. This means that there is no force acting on the sheet 7a which, as seen in FIG. 2, would tend to rotate the sheet 7a about a vertical axis located in the region of the suction device 10. In other words, no moment arms act on the sheet 7a. Thus, even if a vacuum remains in the suction device 10 after the sheet 7a is engaged by the conveyor 12, the axis of the sheet 7a remains parallel to the direction of transport. The axis of the sheet 7a remains parallel to the direction of transport even if the sheet 7a projects slightly into the portion B of the conveyor 12.

When the sheet 7a is relatively large, i.e. when the sheet 7a is sufficiently wide to be engaged by one or more of the rollers 14, 16 in the portion B of the conveyor 12 as well as the rollers 14, 16 in the portion A, certain difficulties arise in transferring the sheet 7a from the suction device 10 to the conveyor 12. These difficulties stem from the fact that the sheet 7a is gripped by the suction device 10 only in the region of one lateral edge thereof.

Only that portion of the sheet 7a which is gripped by the suction device 10 or, in other words, that portion of the sheet 7a opposite the conveyor portion A, is held in alignment with the nips defined by the rollers 14, 16. The remaining portion of the sheet 7a that is, the portion of the sheet 7a which extends into the conveyor portion B, can deflect under its own weight as indicated by the reference numeral 7b in FIG. 1. The deflected portion 7b of the sheet 7a is thus not aligned with the nips defined by the rollers 14, 16.

The grooves 17 provided in the circular flanges 16b of the rollers 16 function to feed the deflected portion 7b of the sheet 7a into the conveyor 12. The leading edge of the deflected portion 7b is received by the grooves 17 and then lifted into the nips between the rollers 14, 16 as the rollers 16 rotate. The operation of lifting the deflected portion 7b into the conveyor 12 is progressive and proceeds in a direction away from the conveyor portion A. Initially, the section of the deflected portion 7b nearest the conveyor portion A is lifted into the conveyor 12 by the roller 16 of the conveyor portion B nearest the conveyor portion A. The next section of the deflected portion 7b is out of engagement with the next roller 16 in the conveyor portion B when lifting of the first section of the deflected portion 7b is begun. However, due to the stiffness of the sheet 7a, the next section of the deflected portion 7b is lifted into engagement with the next roller 16 of the conveyor portion B as the first section of the deflected portion 7b is lifted into the conveyor 12. Accordingly, beginning from the conveyor portion A, successive sections of the deflected portion 7b are lifted by successive rollers 16 of the conveyor portion B until the entire deflected portion 7b of the sheet 7a has been lifted into the conveyor 12. Overall, the lifting operation proceeds quite rapidly.

The grooves 17 in the circular flanges 16b of the rollers 16 make it possible to avoid the difficulties associated with deflection of a large sheet 7a. However, another problem may arise due to the fact that the suction device 10 grips a large sheet 7a only in the region of one lateral edge thereof. This problem is that a moment arm may be caused to act upon the sheet 7a if the vacuum in the suction device 10 is not shut off upon introduction of the sheet 7a into the conveyor 12. Such a moment arm will arise when the entire leading edge of the sheet 7a is engaged by the conveyor 12 and the vacuum in the suction head 10 is not shut off. The moment arm is generated because the deflected portion 7b of the sheet 7a is free to be transported by the conveyor 12 while the portion of the sheet 7a held by the suction device 10 is prevented from moving by the latter. The moment arm is relatively large and is capable of causing rotation of the sheet 7a about an axis normal to the sheet 7a and located in the vicinity of the suction device 10. Should such rotation occur, the sheet 7a will be skewed and the axis of the sheet 7a will no longer be parallel to the direction of transport.

In accordance with the invention, the problem of a moment arm is overcome by appropriate design of the conveyor 12 and the suction device 10. Due to the fact that the rollers 14, 16 of the conveyor portion B are offset relative to one another, the conveying force exerted on the deflected portion 7b of the sheet 7a by the conveyor portion B is relatively small. On the other hand, the conveying force which the conveyor portion A exerts on the remaining portion of the sheet 7a is relatively large since the rollers 14 of the conveyor portion A are received between the circular flanges 16b of the corresponding rollers 16. In other words, the conveyor 12 is designed so that the conveying force in the conveyor portion A exceeds that in the conveyor portion B. Furthermore, the suction device 10 is designed so that the gripping force which it exerts on the sheet 7a exceeds the conveying force of the conveyor section A.

Even though the deflected portion 7b of the sheet 7a constitutes a large moment arm, there is little danger of the sheet 7a being torn away from the suction device 10 and rotated into a skewed position. The reason is that the conveying force of the conveyor portion B is relatively small so that the overall moment is smaller than the gripping force of the suction device 10. In this regard, the relatively large gripping force of the suction device 10 contributes to preventing rotation of the sheet 7a. The relatively large conveying force exerted by the conveyor portion A insures that the sheet 7a is immediately transported by the conveyor 12 in the proper orientation when the vacuum in the suction device 10 is reduced.

The V configuration of the cutouts 19 prevents the sheet 7a from becoming caught in the guide sheet 18 during transport.

Occasionally, two of the sheets 7 in the magazine 2 may cling to one another, e.g. due to static electricity. This may be sensed by a conventional sensing device. The provision of the reversible drive 21 is of advantage when two of the sheets 7 are found to adhere to one another. In such an event, the conveyor 12 is stopped and its direction of motion then reversed. This causes the adhering sheets 7 to be backed out of the conveyor 12 following which the sheets 7 are returned to the magazine 2 by the grooved circular flanges 16b of the rollers 16.

Without further analysis, the foregoing will so fully reveal the gist of the present invention that other can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An arrangement for transferring sheet-like articles having different widths, particularly for transferring film, comprising:
   (a) receiving means for supporting each of the articles at a predetermined location preparatory to transfer;
   (b) conveyor means for transporting the articles along a predetermined direction transverse to the widths of the articles, said conveyor means having a width which is at least equal to that of the widest article, and said conveyor means including first and second portions which are disposed next to one another as considered along the width of said conveyor means, said first portion having a width which approximates or equals that of the narrowest article; and
   (c) gripping means movable between a receiving position opposite said predetermined location, and a delivery position opposite said first portion of said conveyor means, said gripping means having an effective width no greater than that of the narrowest article and being arranged to grip an article at said predetermined location upon movement to said receiving position, and said gripping means being designed to engage each article with a predetermined force for transfer of the article to said delivery position in which the article is engageable by said conveyor means, said first portion of said conveyor means including first pairs of aligned conveying rollers designed to exert a first conveying force smaller than said predetermined force on an article, and said second portion of said conveyor means including second pairs of relatively offset conveying rollers designed to exert a second conveying force smaller than said first conveying force on an article.

2. The arrangement of claim 1, said receiving means being designed to accommodate a container for the sheet-like articles in an upright position, and the articles being arranged one behind the other in upright positions when the container is in said receiving means, the container having a discharge opening for removal of the articles therefrom in generally upright positions; and wherein said receiving means is arranged to hold the container in such a manner that the discharge opening is adjacent to said receiving position.

3. The arrangement of claim 2, the container having a lateral internal abutment, and a lateral edge of each article being moved into contact with the abutment prior to removal of the article from the container in order to position the article for said gripping means; and wherein said gripping means has an effective width which approximates or equals the width of the narrowest article.

4. The arrangement of claim 1, wherein said gripping means has an effective width which approximates or equals the width of the narrowest article to be transferred.

5. The arrangement of claim 1, wherein said gripping means comprises suction means.

6. The arrangement of claim 1, wherein said conveyor means comprises a pair of rotatable shafts, and said conveying rollers are mounted on said shafts for rotation therewith.

7. The arrangement of claim 6, wherein selected rollers each comprise a cylindrical body having a first diameter, and a circular flange having a second diameter greater than said first diameter mounted at each end of the respective cylindrical body.

8. The arrangement of claim 7, one of said shafts being located nearer said receiving means than the other of said shafts; and wherein said selected rollers are mounted on said one shaft.

9. The arrangement of claim 7, wherein the periphery of at least one flange of each selected roller is provided with grooves.

10. The arrangement of claim 7, said selected rollers being mounted on one of said shafts and cooperating with additional rollers mounted on the other of said shafts; and wherein the lengths of said cylindrical bodies exceed the widths of said additional rollers.

11. The arrangement of claim 6, wherein the distance between said shafts and the diameters of said rollers are selected in such a manner that the rollers on the respective shafts overlap.

12. The arrangement of claim 11, wherein rollers of said first pairs on one of said shafts are aligned with and receive the overlapping portions of corresponding rollers on the other of said shafts.

13. The arrangement of claim 6, comprising guide means between said shafts for guiding an article delivered by said gripping means into said conveyor means.

14. The arrangement of claim 13, wherein said guide means comprises a guide sheet which is bent around one of said shafts.

15. The arrangement of claim 14, wherein said one shaft is nearer said receiving means than the other of said shafts.

16. The arrangement of claim 14, wherein said guide sheet is provided with cutouts in the regions of the rollers on said one shaft.

17. The arrangement of claim 16, wherein the rollers on said one shaft project through the respective cutouts.

18. The arrangement of claim 16, wherein selected rollers on said one shaft each comprise a cylindrical body having a first diameter, and a circular flange having a second diameter greater than said first diameter mounted at each end of the respective cylindrical body, said flanges projecting through the respective cutouts.

19. The arrangement of claim 16, wherein said cutouts are substantially V-shaped.

20. The arrangement of claim 1, comprising reversible drive means for said conveyor means.

21. An arrangement for transferring sheets of film having different widths, particularly for transferring X-ray film, comprising:
   (a) receiving means for accommodating a container which holds the sheets of film, said receiving means being designed to support the container in a generally upright position in which the sheets stand essentially on edge one behind the other, and the container having a discharge opening for removal of the sheets therefrom and an internal lateral abutment against which a lateral edge of each sheet is moved prior to withdrawal of the sheet from the container;

(b) conveyor means for transporting the sheets along a predetermined direction transverse to the widths of the sheets, said conveyor means having a width which is at least equal to that of the widest sheet, and said conveyor means including first and second portions which are disposed next to one another as considered along the width of said conveyor means, said first portion having a width which approximates or equals that of the narrowest sheet; and (c) suction means movable between a receiving position opposite the discharge opening of the container, and a delivery position opposite said first portion of said conveyor means, said suction means having an effective width no greater than that of the narrowest sheet and being arranged to grip a sheet contacting the lateral abutment of the container upon movement to said receiving position, and said suction means being designed to engage each sheet with a predetermined force for transfer of the sheet to said delivery position in which the sheet is engageable by said conveyor means, said first portion of said conveyor means including first pairs of aligned conveying rollers designed to exert a first conveying force smaller than said predetermined force on each sheet, and said second portion of said conveyor means including second pairs of relatively offset conveying rollers designed to exert a second conveying force smaller than said first conveying force on each sheet.

22. The arrangement of claim 21, wherein said conveyor means comprises a pair of rotatable shafts, and said conveying rollers are mounted on said shafts for rotation therewith.

23. The arrangement of claim 21, wherein each of selected rollers on one of said shafts comprises a cylindrical body having a first diameter, and a circular flange having a second diameter greater than said first diameter at each end of the respective cylindrical body, the periphery of at least one flange of each selected roller being provided with grooves extending essentially parallel to said shafts.

24. A method of transferring sheet-like articles, particularly films, having different widths, comprising the steps of:

(a) transporting one of said articles from a first location to a second location, said one article including first and second portions which are disposed next to one another as considered along the width of said one article, and said first portion having a width no greater than that of the narrowest of said articles, the transporting step comprising applying a gripping force only to said first portion of said one article; and (b) conveying said one article away from said second location along a predetermined direction transverse to the width of said one article, the conveying step including applying a first conveying force smaller than said gripping force to said first portion of said one article and a second conveying force smaller than said first conveying force to said second portion of said one article.

25. The method of claim 24, wherein said predetermined gripping force is a suction force.

26. The method of claim 24, comprising the step of shifting said article into a predetermined position prior to the transporting step.

* * * * *